United States Patent
Wyble et al.

(10) Patent No.: US 9,869,132 B2
(45) Date of Patent: Jan. 16, 2018

(54) WELLSITE HARDFACING WITH PARTICLE DISTRIBUTION AND METHOD OF USING SAME

(71) Applicant: National Oilwell Varco, L.P., Houston, TX (US)

(72) Inventors: Kevin Joseph Wyble, The Woodlands, TX (US); Alan Jay Harmon, Hockley, TX (US); Kevin Lawrence Williams, Houston, TX (US); Cameron Spiller, Spring, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 175 days.

(21) Appl. No.: 15/016,094

(22) Filed: Feb. 4, 2016

(65) Prior Publication Data

US 2017/0226807 A1    Aug. 10, 2017

Related U.S. Application Data

(60) Provisional application No. 62/112,056, filed on Feb. 4, 2015.

(51) Int. Cl.
| | |
|---|---|
| *E21B 17/16* | (2006.01) |
| *E21B 17/00* | (2006.01) |
| *E21B 10/46* | (2006.01) |
| *E21B 17/20* | (2006.01) |
| *B23K 35/365* | (2006.01) |

(Continued)

(52) U.S. Cl.
CPC ........... *E21B 10/46* (2013.01); *B23K 9/04* (2013.01); *B23K 9/173* (2013.01); *B23K 35/365* (2013.01); *E21B 17/00* (2013.01); *E21B 17/16* (2013.01); *E21B 17/20* (2013.01); *C22C 29/06* (2013.01); *C22C 29/08* (2013.01)

(58) Field of Classification Search
None
See application file for complete search history.

(56) References Cited

U.S. PATENT DOCUMENTS

| | | |
|---|---|---|
| 2,700,091 A | 1/1955 | Culbertson et al. |
| 2,806,129 A | 9/1957 | Cape |
| | (Continued) | |

FOREIGN PATENT DOCUMENTS

| | | |
|---|---|---|
| CN | 1404956 | 3/2003 |
| CN | 1433868 | 8/2003 |
| | (Continued) | |

OTHER PUBLICATIONS

Liu, R. et al., "An Improved Wear-resistant PTA Hardfacing: VWC/Stellite 21", Journal of Composite Materials, vol. 40, No. 24 (2006), cover page and pp. 2203-2215.

(Continued)

*Primary Examiner* — John J Figueroa
(74) *Attorney, Agent, or Firm* — Conley Rose, P.C.

(57) ABSTRACT

A chromium-free, distributed hardfacing disposable on a surface of a wellsite component is disclosed. The hardfacing includes a metal filler (e.g., nickel) and particles distributed about the filler. The particles include pellets made of tungsten carbide and pieces made of angular molybdenum carbide. The pieces are smaller than the pellets for distribution in the filler between the pellets whereby a uniform distribution of particles is provided about the filler.

36 Claims, 9 Drawing Sheets

(51) Int. Cl.
*B23K 9/04* (2006.01)
*B23K 9/173* (2006.01)
*C22C 29/08* (2006.01)
*C22C 29/06* (2006.01)

(56) References Cited

U.S. PATENT DOCUMENTS

| | | | |
|---|---|---|---|
| 3,334,975 A | 8/1967 | Quaas et al. | |
| 3,999,036 A | 12/1976 | Muratov et al. | |
| 4,162,392 A | 7/1979 | Brown et al. | |
| 4,177,324 A | 12/1979 | Brown et al. | |
| 4,224,382 A | 9/1980 | Brown et al. | |
| 4,302,341 A * | 11/1981 | Watson | C09K 8/206 166/291 |
| 4,451,508 A | 5/1984 | Brown et al. | |
| 4,813,495 A | 3/1989 | Leach | |
| 5,004,886 A | 4/1991 | Born et al. | |
| 5,667,903 A | 9/1997 | Boyce | |
| 6,103,997 A | 8/2000 | Pan | |
| 6,138,779 A | 10/2000 | Boyce | |
| 6,321,846 B1 | 11/2001 | Rytlewski | |
| 6,861,612 B2 | 3/2005 | Brooks et al. | |
| 7,373,997 B2 | 5/2008 | Kembaiyan et al. | |
| 7,954,548 B2 * | 6/2011 | Curimbaba | C09K 8/80 166/280.2 |
| 8,858,733 B2 | 10/2014 | Pillai et al. | |
| 8,945,720 B2 | 2/2015 | Sreshta et al. | |
| 2002/0054972 A1 | 5/2002 | Charpentier et al. | |
| 2005/0279494 A1 | 12/2005 | Sachdeva et al. | |
| 2009/0038797 A1 * | 2/2009 | Skala | C09K 8/80 166/280.1 |
| 2010/0101780 A1 | 4/2010 | Ballew et al. | |
| 2010/0236834 A1 | 9/2010 | Xia et al. | |
| 2012/0067651 A1 | 3/2012 | Xia et al. | |
| 2013/0068449 A1 | 3/2013 | Pillai et al. | |
| 2013/0294962 A1 | 11/2013 | Wallin et al. | |
| 2014/0298728 A1 | 10/2014 | Keshavan | |
| 2016/0160615 A1 * | 6/2016 | Greci | E21B 43/045 166/278 |

FOREIGN PATENT DOCUMENTS

| | | |
|---|---|---|
| CN | 1562550 | 1/2005 |
| CN | 2675322 | 2/2005 |
| CN | 101168221 | 4/2008 |
| CN | 101920413 | 12/2010 |
| CN | 102233491 | 11/2011 |
| GB | 618429 | 2/1949 |
| GB | 956830 | 4/1964 |
| KR | 20040083407 | 10/2004 |
| RU | 2339496 | 11/2008 |
| WO | 9415745 | 7/1994 |

OTHER PUBLICATIONS

Kang, S. H. et al., "Thermal Fatigue Characteristics of PTA Hardfaced Steels", Surface Engineering, vol. 17, No. 6. (2001), pp. 498-504.

Postle Industries, Inc., Postalloy Welding Products, "Hard Surfacing Build-Up Tool Steel Repair", www.postle.com, 20 pages.

* cited by examiner

WELLSITE HARDFACING WITH PARTICLE DISTRIBUTION AND METHOD OF USING SAME

CROSS-REFERENCE TO RELATED APPLICATIONS

This application claims the benefit of U.S. provisional Application No. 62/112,056, filed Feb. 4, 2015, the entire contents of which are hereby incorporated by reference.

BACKGROUND

This present disclosure relates generally to techniques for performing wellsite operations. More specifically, the present disclosure relates to wellsite equipment and hardfacing used in wellsite operations.

Oilfield operations may be performed to locate and gather valuable downhole fluids. Oil rigs are positioned at wellsites, and downhole equipment, such as drilling tools, are deployed into the ground by a drillstring to reach subsurface reservoirs. At the surface, the oil rig is provided with various surface equipment, such as a top drive, a Kelly, and a rotating table, to deploy stands of drill pipe into the wellbore to form the drill string. A drill bit is mounted on the lower end of the drill string, and advanced into the earth to form a wellbore. The surface equipment may be used to apply torque to the stands of pipe and to rotate the drill bit.

The downhole equipment is exposed to harsh wellbore conditions during drilling that may cause wear and damage. Hardfacing has been provided to resist such wear. Examples of hardfacing are provided in US Patent/Application Nos. 2011/0031028 and 2013068741, the entire contents of which are hereby incorporated by reference herein.

SUMMARY

In at least one aspect, the present disclosure relates to a distributed hardfacing disposable on a surface of a wellsite component. The hardfacing includes a metal filler and particles distributed about the metal filler. The particles include pellets made of tungsten carbide and pieces made of angular molybdenum carbide. The pieces are smaller than the pellets for distribution in the metal filler between the pellets whereby a uniform distribution of the particles is provided about the metal filler.

The metal filler and the particles are chromium free. The pieces may comprise 5 to 80% by volume of tungsten and molybdenum carbides. The tungsten carbide comprises spherical fused tungsten carbide and nickel pellet tungsten carbide. The molybdenum carbide may be molybdenum angular precipitates carbide. The hardfacing may include one of nickel powder, iron powder, arc stabilizing compound, and combinations thereof.

The pellets may comprise 40 to 60% by volume of spherical fused tungsten carbide and 10 to 20% by volume of nickel pellet tungsten carbide. The pieces may comprise 1 to 5% by volume of molybdenum angular precipitates carbide. The hardfacing may include 10 to 20% by volume of nickel powder, 1 to 6% by volume of iron powder, and 1 to 5% by volume of arc stabilizing compound.

The particles have a size of at least 35 mesh (500 microns) and the pieces have a size of less than 300 microns and the pellets have a size of at least 500 microns. The metal filler may comprise nickel. The pellets are spherical and the pieces are angular. The particles are one of cast, sintered, angular, spherical, plasma densified, cemented, angular, and combinations thereof.

In another aspect, the present disclosure relates to a hardfaced wellsite component disposable into a wellbore. The wellsite component includes a metal component having an outer surface exposed to the wellbore and a distributed hardfacing disposable on the outer surface of the wellsite component. The hardfacing includes a metal filler and particles distributed about the metal filler. The particles include pellets comprising tungsten carbide and pieces comprising angular molybdenum carbide. The pieces are smaller than the pellets for distribution in the metal filler between the pellets whereby a uniform distribution of the particles is provided about the metal filler.

The wellsite component may comprise one of a drill bit and a drill collar, and/or other downhole components (e.g., a drill string, a bottom hole assembly, etc.). The hardfacing is disposed about a periphery of the wellsite component. The hardfacing is disposed in bands peripherally about the wellsite component.

The pellets may comprise spherical fused tungsten carbide and nickel pellet tungsten carbide, and the pieces may comprise molybdenum angular precipitates carbide.

The wellsite component may additionally include a non-uniform hardfacing on another surface of the wellsite component. The non-uniform hardfacing may comprise another filler and pellets, the pellets non-uniformly distributed about the another filler. The another filler may comprise a metal, the pellets comprising spherical tungsten carbide, the pellets having a size of at least 35 mesh (500 micron).

In yet another aspect, the present disclosure relates to a method of hardfacing a surface of a wellsite component. The method involves providing a metal wire including a metal filler and providing particles including pellets and pieces. The pellets include tungsten carbide, the pieces include molybdenum carbide. The method also involves disposing the hardfacing on a surface of the wellsite component. The disposing the hardfacing includes forming a hardfacing melt by heating the metal filler and mixing the heated metal filler with the particles and applying the hardfacing melt to an outer surface of the wellsite component.

The disposing may comprise welding (e.g., arc welding using shielded gases). The providing the metal wire and the providing the particles may be performed separately. The providing the metal wire may involve deploying the wire from a spool and the providing the particles may involve providing the particles in a hopper.

The providing the metal wire and the providing the particles may be performed simultaneously. The metal wire may include a metal coating with the particles therein, and the metal coating may include the metal filler. The applying may involve applying bands of the hardfacing melt to the outer surface.

Finally, in another aspect, the disclosure relates to welding wire for distributing hardfacing on a surface of a component. The welding wire includes a tubular coating having a cavity therein and particles disposed in the cavity. The tubular coating includes a metal filler. The particles include pellets comprising tungsten carbide and pieces comprising angular molybdenum carbide. Upon heating, the particles are distributed about the metal filler. The pieces are smaller than the pellets for distribution in the metal filler between the pellets whereby a uniform distribution of the particles is provided about the metal filler.

The coating may have a diameter of from 1.2 to 4.2 mm. The coating may have a thickness of from 0.4 to 1.4 mm.

The cavity may have a thickness of from 0.4 to 1.4 mm. The welding wire may be a flux cored welding wire. The tungsten carbide includes spherical fused tungsten carbide and nickel pellet tungsten carbide. The molybdenum carbide may include molybdenum angular precipitates carbide. The particles may include 5 to 80% by volume of tungsten and molybdenum carbides.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

DETAILED DESCRIPTION OF THE INVENTION

The description that follows includes exemplary apparatus, methods, techniques, and/or instruction sequences that embody techniques of the present subject matter. However, it is understood that the described embodiments may be practiced without these specific details.

The present disclosure relates to hardfacing (or hardbanding or overlay) of components, such as downhole tools, drill string tubulars, and/or other wellsite components. The hardfacing may be a chromium free composition including a filler with particles distributed therein. The filler may comprise a metal, such as nickel, provided in the form of a wire. The particles may comprise various metal particles, such as tungsten and/or molybdenum carbides. The particles may have various constructions (e.g., cast, sintered, angular, spherical, plasma densified, cemented, and/or angular) and/or various sizes (e.g., small, large, or varied particle sizes) to facilitate distribution in the filler. The hardfacing may be applied to the components by welding a wire containing the particles to form a hardfacing melt that may be applied to a surface of the component.

Figure 1:
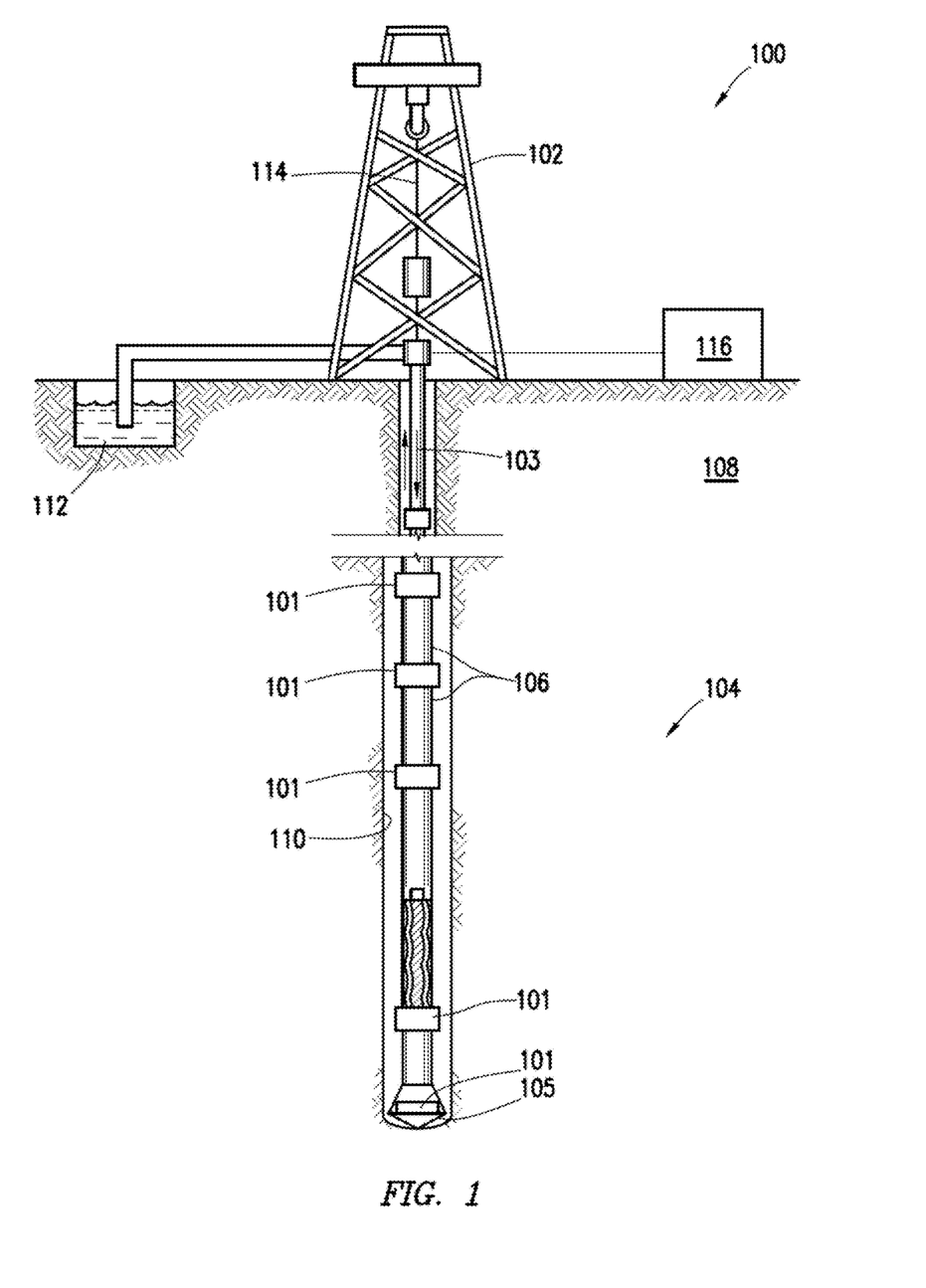
FIG. 1 is a schematic diagram, partially in cross-section of a downhole tool deployed into a wellbore, the downhole tool having hardfacing thereon.

FIG. 1 depicts an example environment in which hardfacing 101 may be employed. In the example of FIG. 1, the hardfacing 101 is used on various wellsite components at a wellsite 100. As shown, the wellsite 100 includes a rig 102 for performing various wellbore operations, such as drilling. The wellsite 100 as shown has wellsite equipment including a drill string 103 with a downhole tool (or bottom hole assembly (BHA)) 104 and a drill bit 105 at an end thereof. The drill bit 105 is advanced into a subterranean formation 108 via the drill string 103 to form a wellbore 110.

The drill string 103 may include tubulars (e.g., drill pipe, drill collars, coiled tubing heavy weight drill pipe, rotary substitutes, pup joints, tool joints, or other tubes) 106 deployable downhole to perform downhole operations. The tubulars 106 are connectable in series to form the drill string 103 for the passage of fluid therethrough. A mud pit 112 may be provided at the surface for passing mud through the drill string 103, the downhole tool 104, and out the bit 105 as indicated by the arrows.

Various surface (or rig) equipment 114, such as a Kelly, rotary table, top drive, elevator, etc., may be provided at the rig 102 to rotate the drill bit 105. A surface unit 116 is also provided at the surface to operate the wellsite equipment. The downhole tool 104 is deployed from the rig 102 and into the wellbore 110 by the drill string 103 to perform downhole operations.

The downhole tool 104 is at a lower end of the drill string 103 and contains various downhole equipment for performing downhole operations. Such equipment may include, for example, motors, measurement tools, electronics, etc. Such downhole equipment may be housed in drill collars or other tubulars.

The hardfacing 101 is shown applied to various downhole components, such as the drill bit 105 and the tubulars 106. The hardfacing 101 may be applied, for example, to resist wear, to provide hardness, to provide reinforcement, and/or to provide an abrasive surface.

While FIG. 1 depicts a land-based drilling rig with a specific configuration, the hardfacing 101 may be usable with a variety of land based, offshore, and/or other wellsite applications involving drilling or other operations. Also, while the hardfacing is depicted as being applied to an outer surface of the various wellsite equipment, such as the tubular 106, the downhole tool 104, and the drill bit 105, it will be appreciated that the hardfacing may be used on any component (wellsite or non-wellsite) having a surface (e.g., solid, machined, non-machined, and/or engineered surfacing) capable of receiving the hardfacing when applied thereto.

Figure 2:
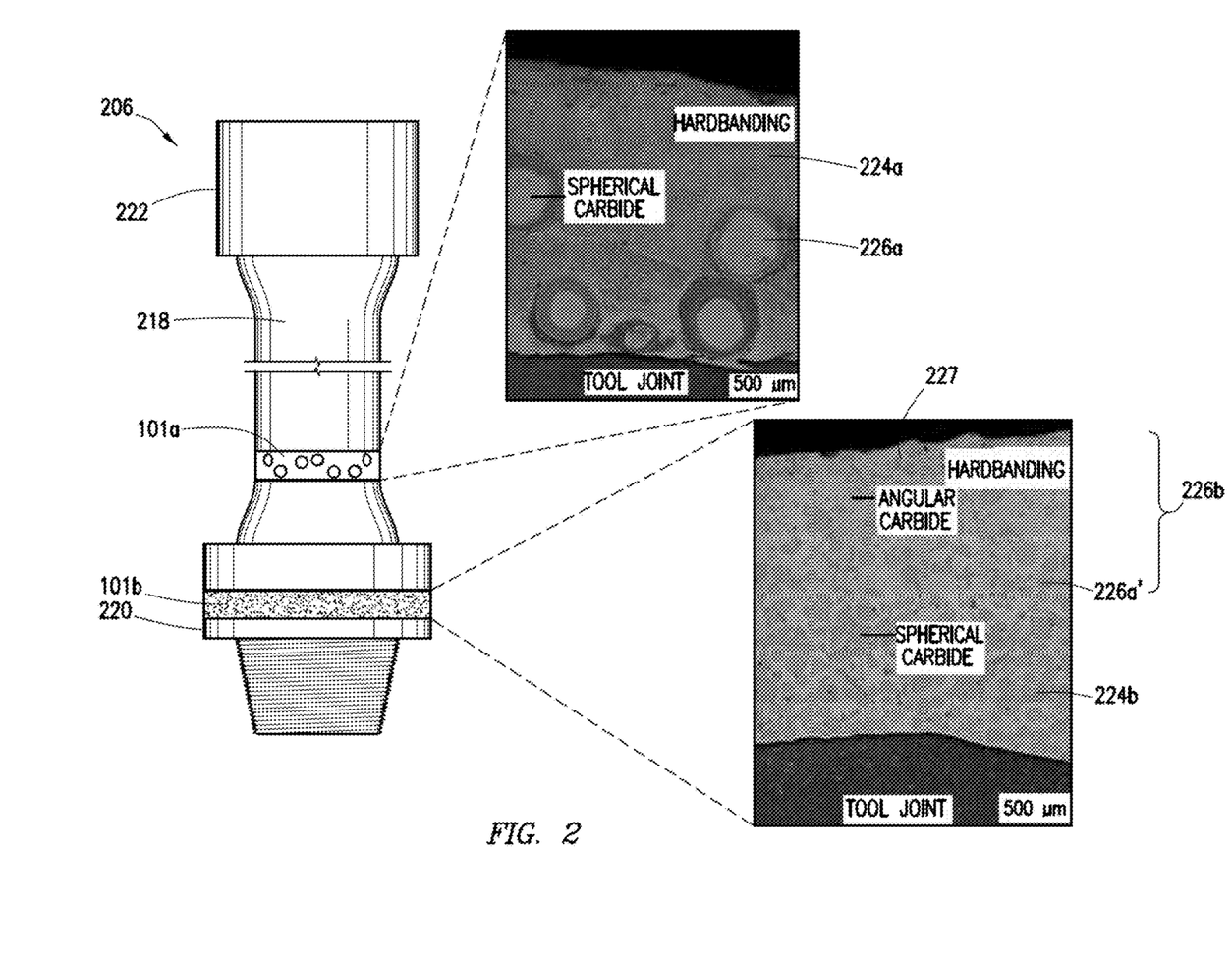
FIG. 2 is a schematic view of a wellsite component having various hardfacings thereon.
Figure 3A:
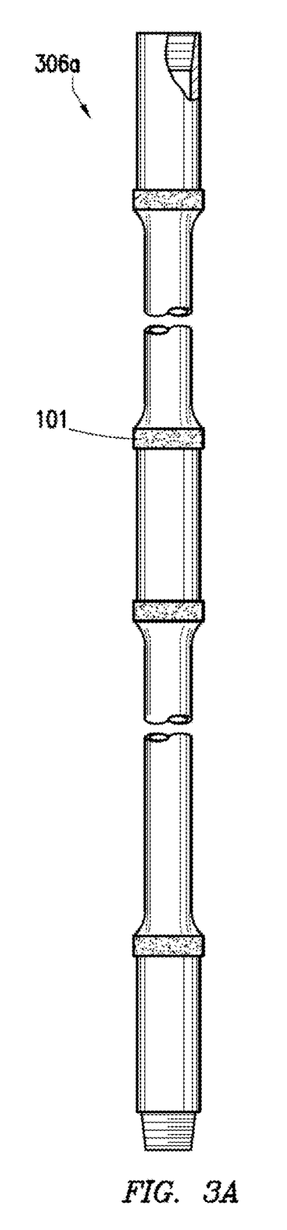
FIGS. 3A-3H are schematic views of various example wellsite components with hardfacing thereon.
Figure 3B:
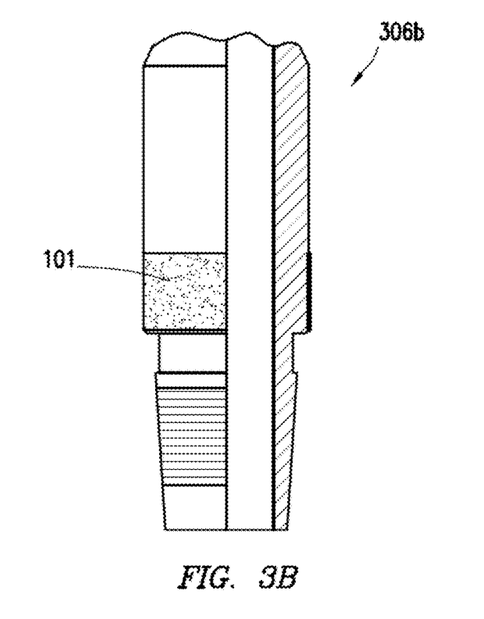
Figure 3C:
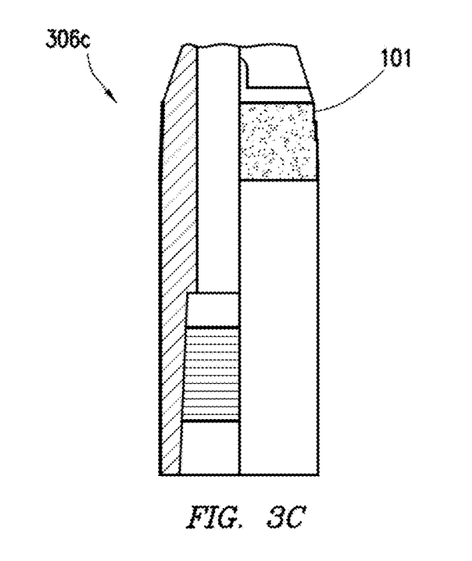
Figure 3D:
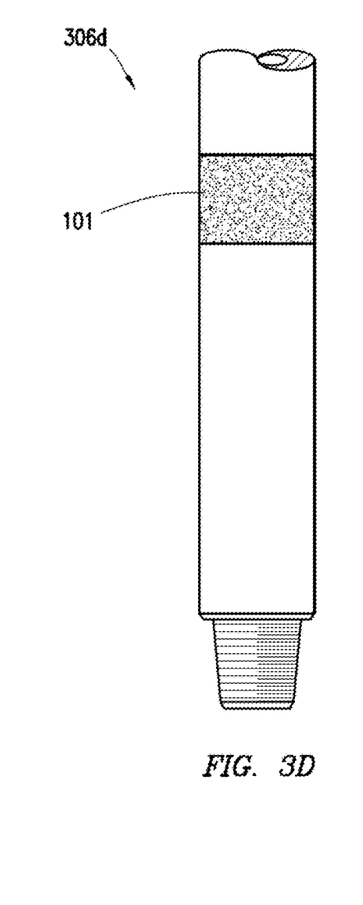
Figure 3E:
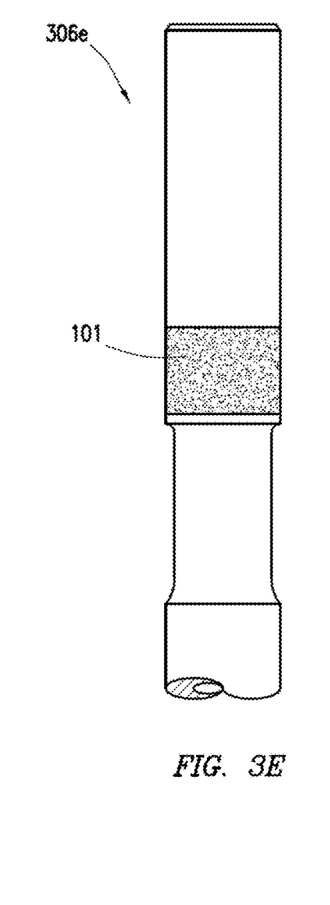
Figure 3F:
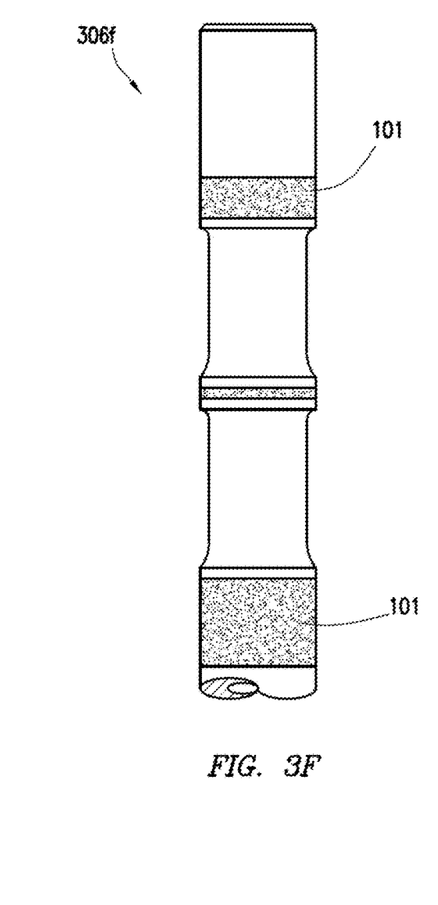
Figure 3G:
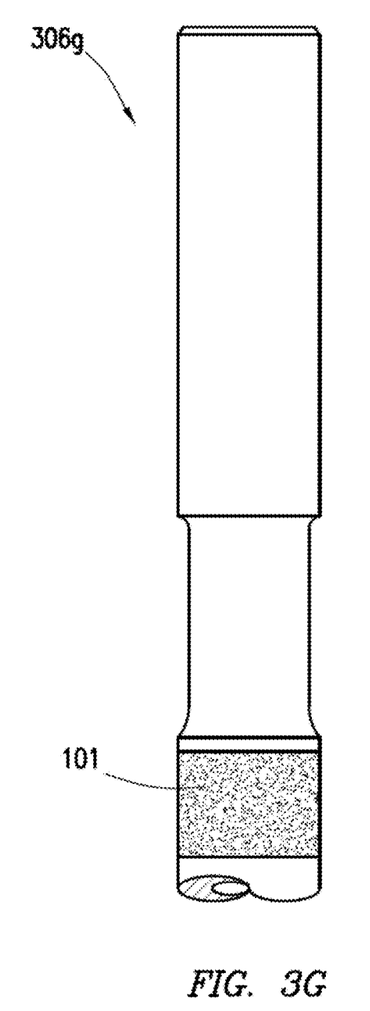
Figure 3H:
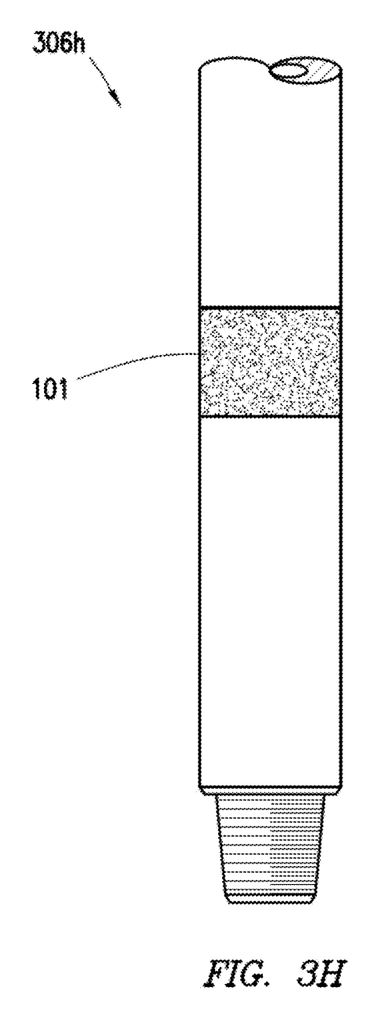

FIG. 2 depicts an example component 206 with various hardfacings 101a,b applied thereto. The component 206 as depicted is a drill pipe usable as the drill pipe 106 of the drill string 103 of FIG. 1. The drill pipe 206 is depicted as having a tubular body including a tubing portion 218, a pin 220, and a box 222. The hardfacing 101a is applied about the tubing portion 218, and the hardfacing 101b is applied about the pin 220. The hardfacings 101a,b include a filler 224a,b with particles 226a,b therein.

The hardfacing 101a is depicted as having a 'non-uniform' configuration. This non-uniform hardfacing 101a may include, for example, the filler 224a with the particles 226a therein. The filler 224a may be a metal, such as a low alloy steel. The pellets 226a may be, for example, spherical tungsten carbide pellets 226a disposed about the filler 224a. The hardbanding and/or filler may include spherical carbides, such as those used in SMOOTHX™ commercially available at www.grantprideco.com.

The pellets 226a may be provided in sizes, for example, of from about 35 mesh (500 micron) to about 10 mesh (2000 micron). The size of the pellets 226a may cause the pellets to clump together in a non-uniform distribution about the filler 224a.

The hardfacing 101b is depicted as having a 'uniform' configuration. The hardfacing 101b is similar to the hardfacing 101a, except that a different filler 224b and particles 226b are used to provide a uniform hardfacing. The particles 226b may include pellets 226a' and pieces 227. The pellets 226a' may be the same as pellets 226a, and in at least some cases have a smaller dimension than the pellets 226a.

As shown, the pieces 227 are smaller than the pellets 226a', and may fill in gaps between the pellets 226a' to facilitate a uniform distribution of particles 226b about the filler 224a. The pieces 227 may range in size from about 2 microns to about 300 microns, or less than about 3 microns in diameter. The pellets 226a' may be spherical and the pieces 227 may be angular in shape. The particles 226b may be, for example, a mixture of the spherical pellets 226a' and the angular pieces 227.

The filler 224b may be a metal, such as nickel. The pellets 226a' may be, for example, tungsten carbide pellets and the pieces 227 may be, for example, angular molybdenum carbide. The particles may be mixtures of the various tungsten and molybdenum carbides of, for example, from about 5% to about 80% by volume. The composition may optionally be chromium-free. Additional components may optionally be included, such as powders (e.g., nickel, iron, etc.) and/or arc stabilizing compounds (e.g. MnSi, BC, etc.)

Table I below provides a list of example components that may be used to form the hardfacing (other compositions and particle sizes may be used):

TABLE I

| MATERIAL | % COMPOSITION | PARTICLE SIZE |
|---|---|---|
| Tungsten Carbide (e.g., Spherical Fused) | from about 40% to about 60% (e.g., 45%) | (from about 50 to about 200 microns) |
| Tungsten Carbide (e.g., Nickel Pellet) | from about 10% to about 20% (e.g., 15%) | (from about 50 to about 200 microns) |
| Nickel Powder | from about 10% to about 20% (e.g., 15%) | |
| Iron Powder | from about 1% to about 6% (e.g., 4%) | |
| Molybdenum angular precipitates carbides | from about 1% to about 5% (e.g., 3%) | (from about 1 to about 3 microns) |
| Arc stabilizing compounds (MnSi, BC) | from about 1% to about 5% (e.g., 3%) | |

The configuration of Table I provides an example composition usable as the hardfacing 101b. The hardfacing 101b of Table I include pellets 226a' made of the spherical fused tungsten carbide and nickel pellet tungsten carbide, pieces 227 made from Molybdenum angular precipitates carbides. The hardfacing 101b is also provided with nickel powder, iron powder, and arc stabilizing compounds. Various combinations of these and other components may be configured in the ranges provided to achieve a desired hardfacing performance.

In an example, the pellets 226a' may be spherical tungsten carbide and the pieces 227 may be angular molybdenum carbide with particle sizes smaller than the particle size of the particles 226a (e.g., spherical carbide particles used in SMOOTHX™ commercially available at www.grantprideco.com). A concentration of carbide in the hardfacing may be increased with the smaller particle sizes to from about 50 to about 70% (e.g., about 60%) carbide.

While FIG. 2 depicts a specific example of a wellsite component 206 with certain configurations of hardfacings 101a,b at certain locations along the wellsite component 206, various dimensions of one or more hardfacings may be disposed about the outer surface of one or more portions of the wellsite component 206 or other component. FIGS. 3A-3H depict additional examples of various tubulars 306a-h with hardfacing 101 (e.g., 101a,b from FIGS. 3A-3H) applied to various locations thereon. The hardfacing 101 of FIG. 3A-3H is depicted as bands of various widths encircling portions of the tubulars 306a-h, but may be of any shape, depth, width, or other geometry.

Figure 4A:
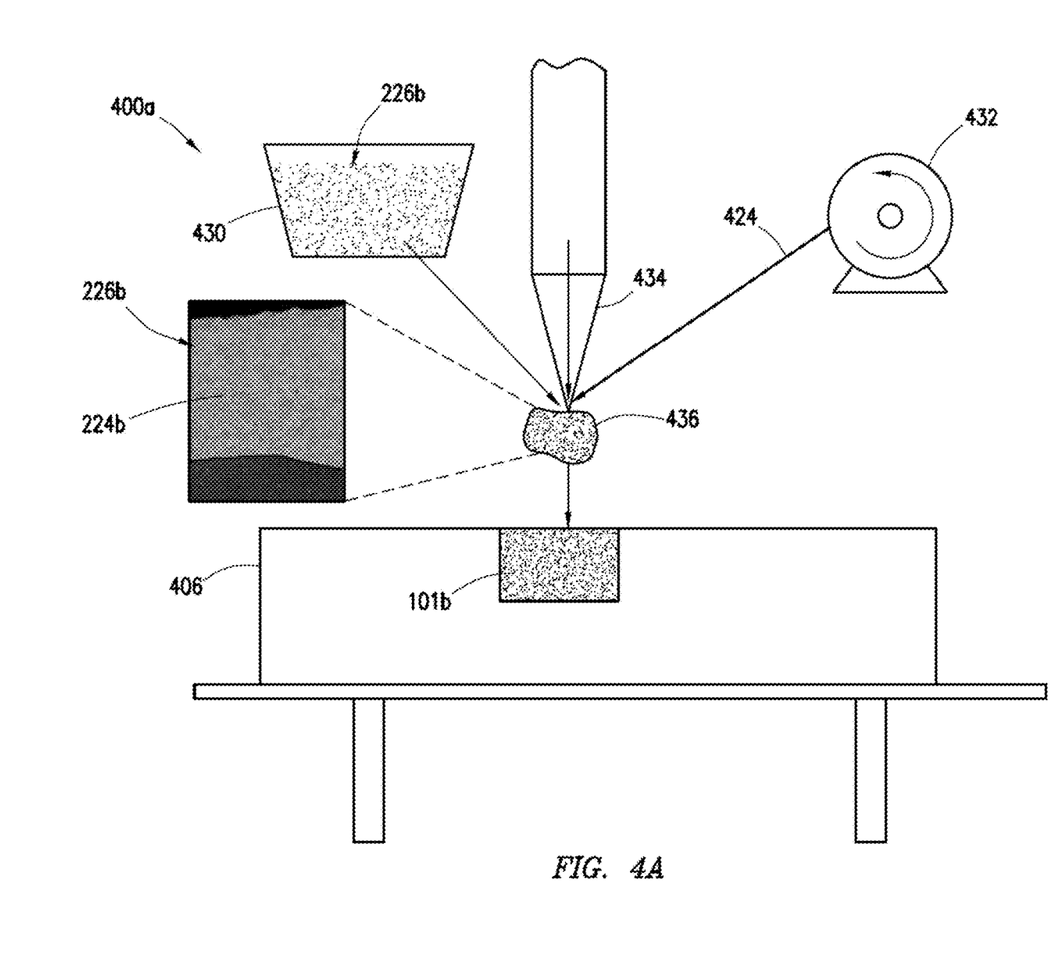
FIGS. 4A and 4B are schematic diagrams depicting application of hardfacing.
Figure 4B:
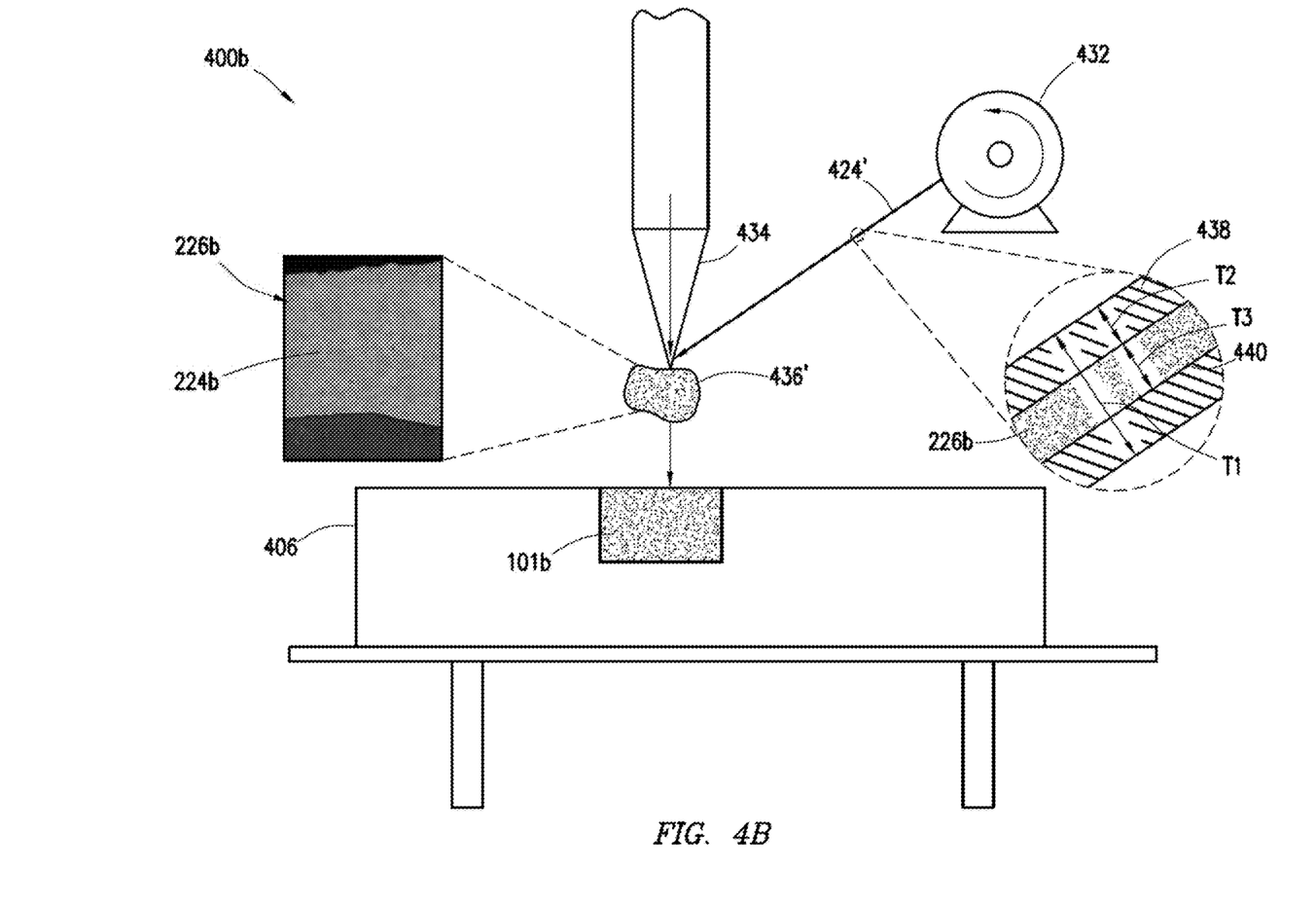

FIGS. 4A and 4B are schematic diagrams depicting an example process 400a,b for applying hardfacing 101b to a component 406. The processes 400a,b may be part of a manufacturing process for forming the component 406, or a separate process. The component 406 is depicted as an elongate member having a solid outer surface configured to receive the hardfacing 101b thereon. In this example, the hardfacing 101b is depicted as the uniform hardfacing 101b of FIG. 2, but any hardfacing(s) may be employed.

The process 400a includes a hopper (or dispenser) 430 having particles 226b therein, and spool 432 having a wire 424 dispensed therefrom. The particles 226b may be pellets 226a, 226a', and/or pieces 227 (FIG. 2). One or more hoppers 430 may be provided to dispense the particles 226b for application. For example, the pellets 226a' and pieces 227 may be in separate hoppers 430, or combined in the same hopper 430. The wire 424 may be a wire made of a metal, such as nickel, steel or alloy, used to form the filler 224b.

The hopper 430 dispenses the particles 226b and the spool 432 dispenses the wire 424 for welding to the component 406. The particles 226b and wire 424 are heated and melted together by welder 434 to form a melt 436. Welding may be used to join together metal components, or to apply material onto components. Welding may be performed by applying heat to a metal using arc welding or other processes. The heated metal may be melted onto a component so that, when cooled, the metal is affixed to the component. The welder 434 may be, for example, an open arc welder. The welder 434 may be used in combination with shielding gases, such as 98% Ar-2% O2, 100% CO2, 75% CO2-25% Ar, 100% Ar, etc.

The melt 436 includes the filler 224b from the wire 424 with the particles 226b dispersed therein. The melt 436 is applied as an overlay onto the surface of component 406. The thickness of the overlay of the melt 436 applied to the component 406 may be, for example, from about 1/16 inches (0.16 cm) to about 0.125 inches (0.32 cm) of thickness. Overlays of the melt 436 may be applied in bands along the component 406. The bands may be about 1 inch (2.54 cm) thick and as long as desired. One or more bands may be applied by moving the melt 436 and/or component 406 as the melt 436 is dispensed. One or more layers of the overlays of the melt 436 may be applied.

The process 4B is the same as the process 4A, except that the wire 424 has been replaced with a wire 424' and the hopper 430 is not used. Optionally, if desired, the hopper 430 may be provided to add one or more particles and/or pieces to the melt 436'. In this case, the wire 424' may be a flux core wire melted by welder 434 to form a melt 436' applied to the component 406.

The flux core wire 424' as shown has a 'pixy stick' configuration, and includes a coating 438 defining a cavity 440 for receiving the particles 226b therein. The coating 438 acts as a carrier for the particles 226b. The coating 438 is melted with the particles 226b and forms the filler 224b to house the particles 226b. The coating 438 may be an insulating coating, such as a nickel sheathing, used to form the filler 224b.

The dimensions of the wire 424' may be selected as desired. As shown, the wire 424' has a thickness (or diameter) T1 of from about 1.2 to about 4.2 mm, the coating 438 has a thickness T2 of from about 0.4 to about 1.4 mm, and the cavity 440 has a thickness T3 of from about 0.4 to about 1.4 mm. The materials and dimensions of the wire 424' may be selected to provide the desired filler 224b to facilitate application to the component 406 and/or the uniform distribution of the particles thereon.

EXAMPLE

In an example involving application of hardfacing to a drill collar, a flux core wire with a coating having particles therein was provided. The wire coating comprised nickel sheathing. The particles are comprised of tungsten carbide particles having a size less than 500 microns and angular molybdenum pieces having a size less than 500 microns. The flux core wire was heated with an arc welder to form a melt, and applied to the pin shoulder of a drill collar. The melt was applied in 1 inch (2.54 cm) bands as the drill collar was rotated under the arc welder. An overlay of 1 inch (2.54 cm) thickness was applied to the periphery of the pin shoulder of the drill collar in three 1 inch (2.54 cm) bands of hardfacing.

While FIGS. 4A and 4B show specific examples of processes 400a,b with specific combinations of components, such as hopper 430 and/or spool 432 forming the melt 436, 436' for application to the component 406, it will be appreciated that one or more processes 400a,b (separately or combined) may be used to weld the hardfacing 101 to the wellsite component. The process(es) may employ various combinations of one or more hoppers 430, spools 432, pellets 226a, 226a', particles 226b, wires 424, 424', and welders 434 to provide the desired melt 436, 436' to achieve the desired hardfacing. One or more hardfacings may be applied simultaneously or independently to various dimensions of the wellsite component.

Figure 5:
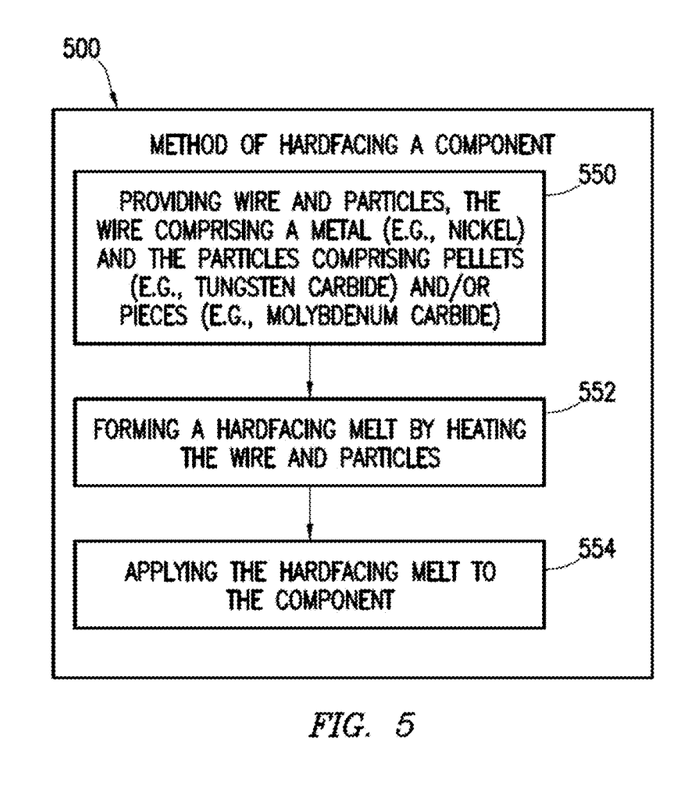
FIG. 5 is a flow chart depicting a method of hardfacing a component.

FIG. 5 is a flow chart depicting a method 500 of hardfacing a component. The method 500 involves providing 550 a wire 424 comprising a metal (e.g., Nickel) and particles comprising pellets (e.g., tungsten carbide) and/or pieces (e.g., molybdenum carbide). The method further involves forming 552 a hardfacing melt by heating the wire and particles, and 554—applying the hardfacing melt to the component. The method may be performed in any order, and repeated as desired.

The present disclosure also provides a method for forming a welding wire having a metal coating and with particles therein. The welding wire is intended to be heated to mix the metal coating with the particles therein, for example, for application onto components. The coating is crimped about the particles to secure the particles therein.

Figure 6:
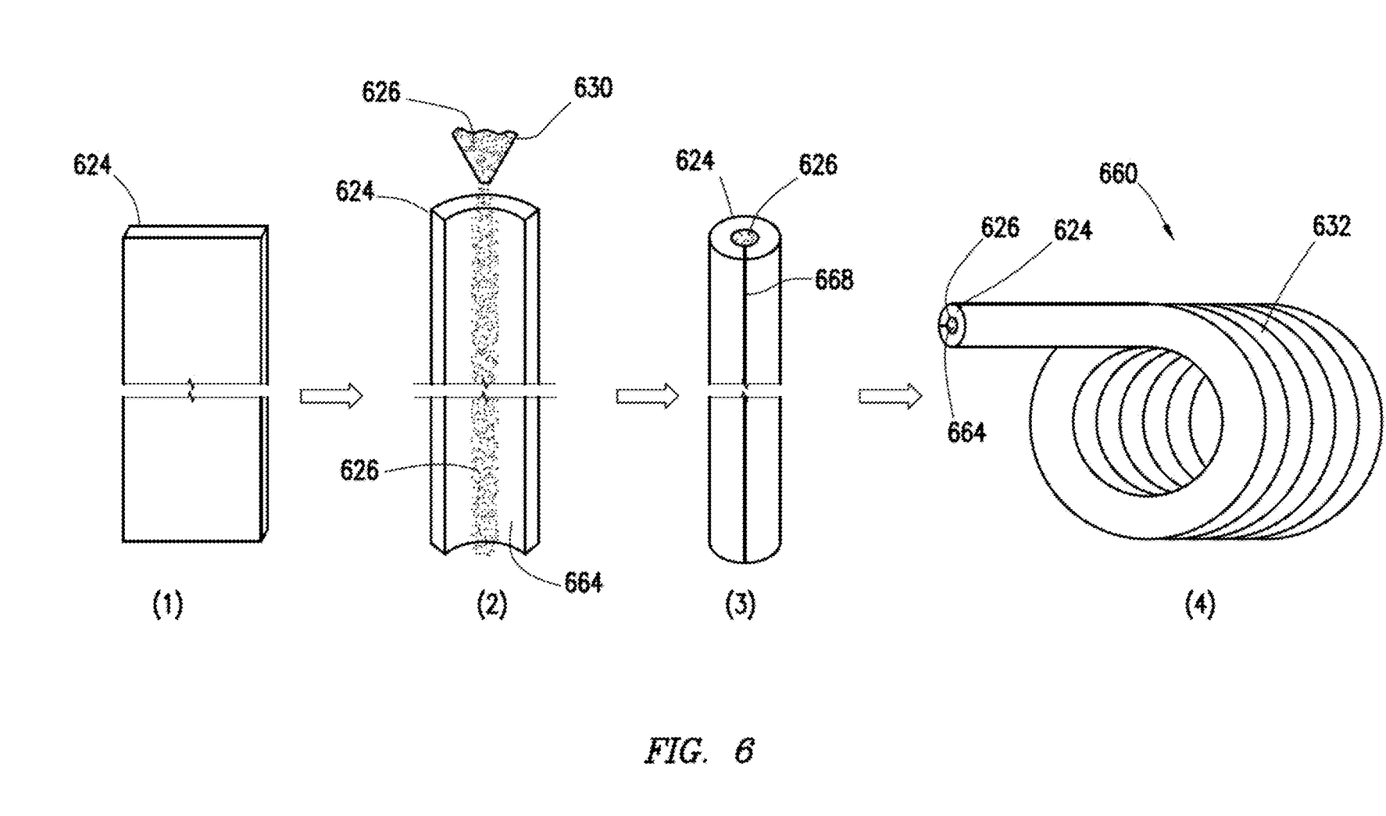
FIG. 6 is a schematic diagram depicting formation of a welding wire.

FIG. 6 is a schematic diagram depicting the formation of a welding wire 660. The welding wire 660 may be used as the wire 424' of FIG. 4B. As shown, the welding wire 660 is formed in stages (1)-(4). The welding wire 660 includes a coating 624 and particles 626 positionable therein. The materials used for the coating 624 may be the same as those used for the filler 224a,b and the particles 626 may be the same as the particles 226a,b of FIG. 2. The coating 624 and the particles 626 may be selected based on the intended use. For example, in a welding application, such as shown in FIG. 4B, the coating 624 may be a metal coating, and the particles 626 may be pellets or powder made of metal or other material.

The coating 624 may be provided as a strip of material as shown in stage (1). The coating 624 may be bent or curved along its linear axis to define a cavity 664 to receive the particles 626 therein as shown in stage (2). The particles 626 may be dispensed from a dispenser 630 (e.g., hopper 430 of FIG. 4A) into the cavity 664.

Once the cavity 664 is filled, the coating 624 may be sealed about the particles 626 to form the welding wire 660 as shown in stage (3). The coating 624 may be secured in place about the particles 626 by crimping the coating 624 along seam 668 to enclose the coating 624 about the particles 626. The coating 624 may also be secured by other means, such as bonding, adhering, tacking, sealing, or otherwise connecting ends of the coating together to secure the particles therein. The welding wire 660 may be rolled into spools 632 as shown in stage (4) for storage, transport and/or use. An example depicting use of the welding wire from a spool is shown in FIG. 2.

Figure 7:
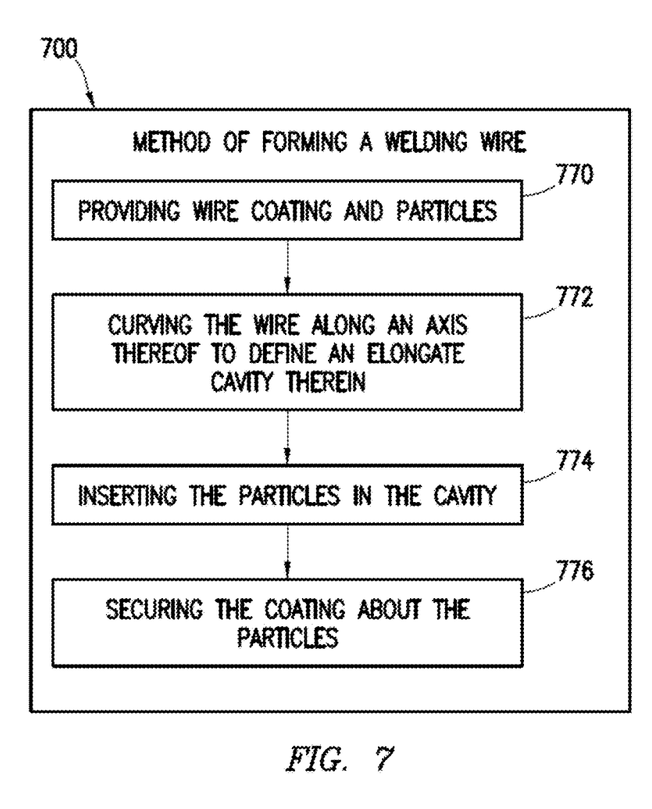
FIG. 7 is a flow chart depicting a method of forming a welding wire.

FIG. 7 shows a method 700 of forming a welding wire. The method involves 770—providing wire coating and particles, 772—curving the wire along an axis thereof to define an elongate cavity therein, 774—inserting the particles in the cavity, and 776—securing the coating about the particles. The sealing may be performed by crimping, bonding, and/or other means. The method may be performed in any order, and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the invention may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, one or more of the process herein (or combinations of portions thereof) may be used to form one or more types of hardfacing(s) for application to one or more wellsite components. In another example, the hardfacing, welding wire, particles, pellets, pieces, and/or fillers may be made of various materials, such as various combinations of those described herein.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A distributed hardfacing disposable on a surface of a component, the hardfacing comprising:
   a metal filler; and
   particles distributed about the metal filler, the particles comprising:
      pellets comprising tungsten carbide; and
      pieces comprising angular molybdenum carbide;
   wherein the pieces are smaller than the pellets for distribution in the metal filler between the pellets whereby a uniform distribution of the particles is provided about the metal filler.

2. The distributed hardfacing of claim 1, wherein the metal filler and the particles are chromium free.

3. The distributed hardfacing of claim 1, wherein the particles comprise 5 to 80% by volume of tungsten and molybdenum carbides.

4. The distributed hardfacing of claim 1, wherein the tungsten carbide comprises spherical fused tungsten carbide and nickel pellet tungsten carbide.

5. The distributed hardfacing of claim 1, wherein the molybdenum carbide comprises molybdenum angular precipitates carbide.

6. The distributed hardfacing of claim 1, further comprising one of nickel powder, iron powder, arc stabilizing compound, and combinations thereof.

7. The distributed hardfacing of claim 1, wherein the pellets comprise 40 to 60% by volume of spherical fused tungsten carbide and 10 to 20% by volume of nickel pellet tungsten carbide.

8. The distributed hardfacing of claim 7, wherein the pieces comprise 1 to 5% by volume of molybdenum angular precipitates carbide.

9. The distributed hardfacing of claim 8, further comprising 10 to 20% by volume of nickel powder, 1 to 6% by volume of iron powder, and 1 to 5% by volume of arc stabilizing compound.

10. The distributed hardfacing of claim 1, wherein the pellets particles have a size of at least 35 mesh (500 microns) and the pieces have a size of less than 300 microns and the pellets have a size of at least 500 microns.

11. The distributed hardfacing of claim 1, wherein the metal filler comprises nickel.

12. The distributed hardfacing of claim 1, wherein the pellets are spherical and the pieces are angular.

13. The distributed hardfacing of claim 1, wherein the particles are one of cast, sintered, angular, spherical, plasma densified, cemented, angular, and combinations thereof.

14. The distributed hardfacing of claim 1, wherein the component comprises a wellsite component.

15. A hardfaced wellsite component disposable into a wellbore, the wellsite component comprising:
   a metal component having an outer surface exposed to the wellbore; and
   a distributed hardfacing disposable on the outer surface of the wellsite component, the hardfacing comprising:
      a metal filler; and
      particles distributed about the metal filler, the particles comprising:
         pellets comprising tungsten carbide; and
         pieces comprising angular molybdenum carbide;
      wherein the pieces are smaller than the pellets for distribution in the metal filler between the pellets whereby a uniform distribution of the particles is provided about the metal filler.

16. The hardfaced wellsite component of claim 15, wherein the wellsite component comprises one of a drill bit, a drill string, a bottom hole assembly, drill pipe, a drill collar, coiled tubing, heavy weight drill pipe, rotary substitutes, pup joints, tool joints, and combinations thereof.

17. The hardfaced wellsite component of claim 15, wherein the hardfacing is disposed about a periphery of the wellsite component.

18. The hardfaced wellsite component of claim 15, wherein the hardfacing is disposed in bands peripherally about the wellsite component.

19. The hardfaced wellsite component of claim 15, wherein the pellets comprise spherical fused tungsten carbide and nickel pellet tungsten carbide, and the particles comprise molybdenum angular precipitates carbide.

20. The wellsite component of claim 15, further comprising a non-uniform hardfacing on another surface of the wellsite component.

21. The wellsite component of claim 20, wherein the non-uniform hardfacing comprises another filler and pellets, the pellets non-uniformly distributed about the another filler, the another filler comprising a metal, the pellets comprising spherical tungsten carbide, the pellets having a size of at least 35 mesh (500 microns).

22. A method of hardfacing a surface of a wellsite component, the hardfacing comprising:
   providing a metal wire comprising a metal filler;
   providing particles comprising pellets and pieces, the pellets comprising tungsten carbide, the pieces comprising molybdenum carbide;
   disposing the hardfacing to a surface of the wellsite component by:
      forming a hardfacing melt by heating the metal filler and mixing the heated metal filler with the particles; and
      applying the hardfacing melt to an outer surface of the wellsite component.

23. The method of claim 22, wherein the disposing comprises welding.

24. The method of claim 23, wherein the welding comprises arc welding using shielded gases.

25. The method of claim 22, wherein the providing the metal wire and the providing the particles are performed separately.

26. The method of claim 22, wherein the providing the metal wire comprises deploying the metal wire from a spool and wherein the providing the particles comprises providing the particles in a hopper.

27. The method of claim 22, wherein the providing the metal wire and the providing the particles are performed simultaneously, the metal wire comprising a metal coating with the particles therein, the metal coating comprising the metal filler.

28. The method of claim 22, wherein the applying comprises applying bands of the hardfacing melt to the outer surface.

29. A welding wire for distributing hardfacing on a surface of a component, the welding wire comprising:
   a tubular coating having a cavity therein, the tubular coating comprising a metal filler;
   particles disposed within the cavity, the particles comprising:
      pellets comprising tungsten carbide; and
      pieces comprising angular molybdenum carbide;
   wherein, upon heating, the particles are distributed about the metal filler, the pieces being smaller than the pellets for distribution in the metal filler between the pellets whereby a uniform distribution of the particles is provided about the metal filler.

30. The welding wire of claim 29, wherein the coating has a diameter of from 1.2 to 4.2 mm.

31. The welding wire of claim 29, wherein the coating has a thickness of from 0.4 to 1.4 mm.

32. The welding wire of claim 29, wherein the cavity has a thickness of from 0.4 to 1.4 mm.

33. The welding wire of claim 29, wherein the welding wire is a flux cored welding wire.

34. The welding wire of claim 29, wherein the tungsten carbide comprises spherical fused tungsten carbide and nickel pellet tungsten carbide.

35. The welding wire of claim 29, wherein the molybdenum carbide comprises molybdenum angular precipitates carbide.

36. The welding wire of claim 29, wherein the particles comprise 5 to 80% by volume of tungsten and molybdenum carbides.

* * * * *